United States Patent
Ehmann et al.

(10) Patent No.: US 7,051,764 B2
(45) Date of Patent: May 30, 2006

(54) SYSTEM OF LINES

(75) Inventors: Werner Ehmann, Stuttgart (DE); Joachim Kieserling, Kernen (DE); Frank Scheyhing, Magstadt (DE); Martin Surger, Mutlangen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/468,460

(22) PCT Filed: Jan. 26, 2002

(86) PCT No.: PCT/EP02/00824

§ 371 (c)(1), (2), (4) Date: Feb. 4, 2004

(87) PCT Pub. No.: WO02/066882

PCT Pub. Date: Aug. 29, 2002

(65) Prior Publication Data

US 2004/0112449 A1    Jun. 17, 2004

(30) Foreign Application Priority Data

Feb. 20, 2001    (DE) ................ 101 07 872

(51) Int. Cl.
*F16L 55/04* (2006.01)

(52) U.S. Cl. .......................... 138/30; 138/26

(58) Field of Classification Search ............. 138/30, 138/28, 26; 181/206, 196; 60/469; 417/312, 417/540
See application file for complete search history.

(56) References Cited

U.S. PATENT DOCUMENTS

| | | | |
|---|---|---|---|
| 3,215,164 A | | 11/1965 | Szczepanski |
| 3,323,305 A | | 6/1967 | Klees |
| 4,448,217 A | * | 5/1984 | Mercier ................ 138/30 |
| 5,094,271 A | * | 3/1992 | Fritz et al. ............ 138/30 |
| 5,185,002 A | | 2/1993 | Venturini |
| 5,201,343 A | | 4/1993 | Zimmermann et al. |
| 5,495,711 A | * | 3/1996 | Kalkman et al. ........ 60/469 |
| 5,539,164 A | * | 7/1996 | van Ruiten ........... 181/233 |
| 5,697,216 A | * | 12/1997 | Phillips ............... 60/469 |
| 5,791,141 A | | 8/1998 | Phillips |
| 5,941,283 A | * | 8/1999 | Forte ................. 138/26 |
| 6,073,656 A | | 6/2000 | Chen et al. |
| 6,269,841 B1 | * | 8/2001 | Chen et al. ............ 138/30 |

(Continued)

FOREIGN PATENT DOCUMENTS

DE    1475701    12/1969

(Continued)

OTHER PUBLICATIONS

International Search Report, Jul. 22, 2002, PCT/EP02/00824.

(Continued)

*Primary Examiner*—James Hook
(74) *Attorney, Agent, or Firm*—Crowell & Moring LLP

(57) ABSTRACT

A line arrangement is provided for transmitting volume flows of fluids with a port which is assigned to a pump, a port which is assigned to an actuator and a connecting line which connects the pump to the actuator. An amplified damping effect of pulsations occurring in the line arrangement is achieved in that at least one line through which there is not a flow and which is composed at least partially of an elastic hose should branch off from the connecting line. At least one inner hose oriented axially with respect to the elastic hose is provided which has at least one free end opening axially to an axial space of the elastic hose.

15 Claims, 2 Drawing Sheets

U.S. PATENT DOCUMENTS

| | | | |
|---|---|---|---|
| 6,338,363 B1 * | 1/2002 | Chen et al. | 138/26 |
| 6,536,457 B1 * | 3/2003 | Dooley | 137/13 |
| 6,688,423 B1 * | 2/2004 | Beatty et al. | 181/207 |

FOREIGN PATENT DOCUMENTS

| | | |
|---|---|---|
| DE | 35 10 267 A1 | 10/1985 |
| DE | 9003635 U1 | 7/1990 |
| JP | 59-93590 A | 5/1984 |
| JP | 60-201194 A | 10/1985 |
| JP | U03-17399A (DV) | 2/1991 |
| JP | 09-079474 | 3/1997 |
| JP | 10-185075 A | 7/1998 |
| JP | 11-294679 | 10/1999 |

OTHER PUBLICATIONS

Japanese Office Action Dated Oct. 7, 2005 w/ English Language Translation (five (5) pages).

* cited by examiner

SYSTEM OF LINES

BACKGROUND AND SUMMARY OF THE INVENTION

The invention relates to a line arrangement for transmitting volume flows of fluids, having a port which is assigned to a pump, a port which is assigned to an actuator and a connecting line which connects the pump to the actuator.

In such hydraulic lines, pressure pulsations may arise which excite resonances in the lines which may not only be the cause of disrupting noises but also of loosening of screwed connections and/or of wear.

In order to avoid these difficulties it is known to connect one or more pressure convectors to the lines through which fluids flow and which are configured in their volume and in their pilot pressure in such a way that they as far as possible damp the pressure fluctuations which occur. A disadvantage with these pressure accumulators is, however, that they have a large volume and are thus heavy, which leads to problems in many areas of application of line arrangements owing to the poor adaptability. In addition, these known solutions are relatively expensive and difficult to configure or adjust to the respective application case.

Furthermore, in order to avoid pressure pulsations in lines, it is known, for example, from DE 35 10 267 A1, to provide a feed hose—i.e. a hose through which there is a flow and which is arranged between the pump and actuator—which is provided with an outer flexible hose part and an inner flexible hose part which is arranged coaxially in the outer hose part and extends only over part of the outer hose part. The inner hose part is connected by one of its ends to a connecting element to the outer hose part, and forms with the outer hose part an elongated, annular space. As the inner hose part does not extend over the entire length of the outer hose part, an empty chamber is produced adjacent to the elongated annular space. This is a region in which the fluid is surrounded only by the outer hose part. In this fluid arrangement, the fluid firstly flows through the inner hose part before it flows into the empty chamber. The inner hose part is therefore oriented with its free end in the direction of the actuator, in other words in the flow direction.

The known damping element acts as follows: in the described hose arrangement, pressure pulsations run firstly into the empty chamber via the inner hose part. Some of the migrating pulsation waves will propagate in the downstream direction in the empty chamber while other pulsation waves will propagate in the upstream direction in the elongated annular space between the inner and outer hose parts. The waves which are directed upstream are deflected at the inner end wall of the connecting element and migrate downstream again in the annular cavity and are superimposed on the migrating pulsation waves which emerge from the inner hose part. In this superimposition process, the waves are partially superimposed one on the other in antiphase, resulting in a damping effect.

In some hydraulic systems, in particular in piston pumps, the damping effect of the described line arrangement is not sufficient to damp adequately the high emission of pulsations, and thus the high emission of noise of the pump.

Against this background, the object of the present invention is to provide a line arrangement for transmitting volume flows of the above mentioned type in which the damping effect is amplified.

This object is achieved with a line arrangement for transmitting volume flows of fluids, having a port which is assigned to a pump, a port which is assigned to an actuator, and a connecting line which connects the pump to the actuator, wherein at least one line through which there is not a flow and which is at least partially composed of an elastic hose branches off from the connecting line. This object is also achieved by providing a line arrangement for transmitting volume flows of fluids, having a port which is assigned to a pump, a port which is assigned to an actuator, and a connecting line which connects the pump to the actuator, wherein at least one line which runs in parallel with the connecting line and which is composed at least partially of an elastic hose is provided.

Accordingly, the solution according to the invention is defined in that at least one line through which there is not a flow and which branches off from a connecting line between pump and load is provided in the line arrangement. This line through which there is not a flow is composed at least partially of an elastic hose and is closed off at its end facing away from the branch. Owing to the resilience of the hose wall at increased pressures, the line through which there is not a flow can replace a relatively large volume and as a result compensate pressure pulsations. If such a resilient hose through which there is not a flow is connected to a hose arrangement of this generic type, the damping effect which is described acts on the entire line arrangement. The arrangement according to the invention brings about considerable damping of the pulsations, which is manifest in particular by drastically lower noise emissions of the pump.

The elastic hose can extend over the entire length of the line through which there is not a flow. However, it can extend over only part of this line, the other part being composed, for example, of a metal tube.

The described object is also achieved by a line arrangement of the generic type in which at least one line which runs in parallel with the connecting line and which is composed of an elastic hose is provided. In this context, a line which is guided in parallel is to be understood as a line which branches off from the connecting line at one location and joins it again at another location downstream on the connecting line. In this exemplary embodiment, the fluid which is fed through the line arrangement is therefore conducted in parallel through both lines. Owing to the resilience of the hose wall, the line which is guided in parallel also has the effect of compensating pulsations in this case, which has a positive effect on the noise emissions of the line arrangement.

The line which is guided in parallel can be composed completely or only partially of an elastic hose.

According to one embodiment, the lines through which there is not a flow and which are guided in parallel branch off directly at the port of the connecting line which is assigned to the pump. In this case, particularly good degrees of damping are obtained. The branching can, however, also take place in any other region of the connecting line.

It has proven particularly advantageous if at least one inner hose with a relatively small diameter which is oriented coaxially in the outer hose is provided in the elastic hose which is arranged as a line through which there is not a flow or as a parallel line. Said inner hose can be attached by one of its ends to the outer elastic hose. The connection of the outer and inner hoses can be made, for example, by means of a sleeve which is arranged between the outer and inner hoses, is connected to one end of the inner hose and is held by a sleeve-shaped clamp which is arranged around the outer hose. However, connection can also be made in any other way which is familiar to the person skilled in the art.

The free end of the inner hose which is not connected to the sleeve can be oriented in the direction of the pump or in the direction of the closed-off end of the elastic hose in the case of the line through which there is not a flow, or in the direction of the actuator in the case of the line which is guided in parallel. The sleeve can also be arranged in the center of the inner hose so that the latter has two free ends, one of which points in the direction of the pump, another in the opposite direction.

The additional combination of lines through which there is not a flow or guided in parallel, and an interruption in the fluid column in the line arrangement which is achieved by means of additional inner hoses can reduce the noise emissions considerably over wide rotational speed ranges of the pump.

A plurality of inner hoses can also be arranged in the outer elastic hose. These can all be pointing in the same direction or else in different directions. The length of the inner hoses can also vary. By means of the variants mentioned above, the degree of damping of the line arrangement according to the invention can be set precisely to the respective application cases.

It is also conceivable, in addition to the line through which there is not a flow or the line which is guided in parallel, to make part of the connecting line between the pump and the actuator from an elastic hose. In this hose it is also possible to provide inner hoses with relatively small diameters in the above-mentioned variations.

The invention will be explained in more detail below by reference to the exemplary embodiment illustrated in the drawings.

DETAILED DESCRIPTION OF THE DRAWINGS

Figure 1:
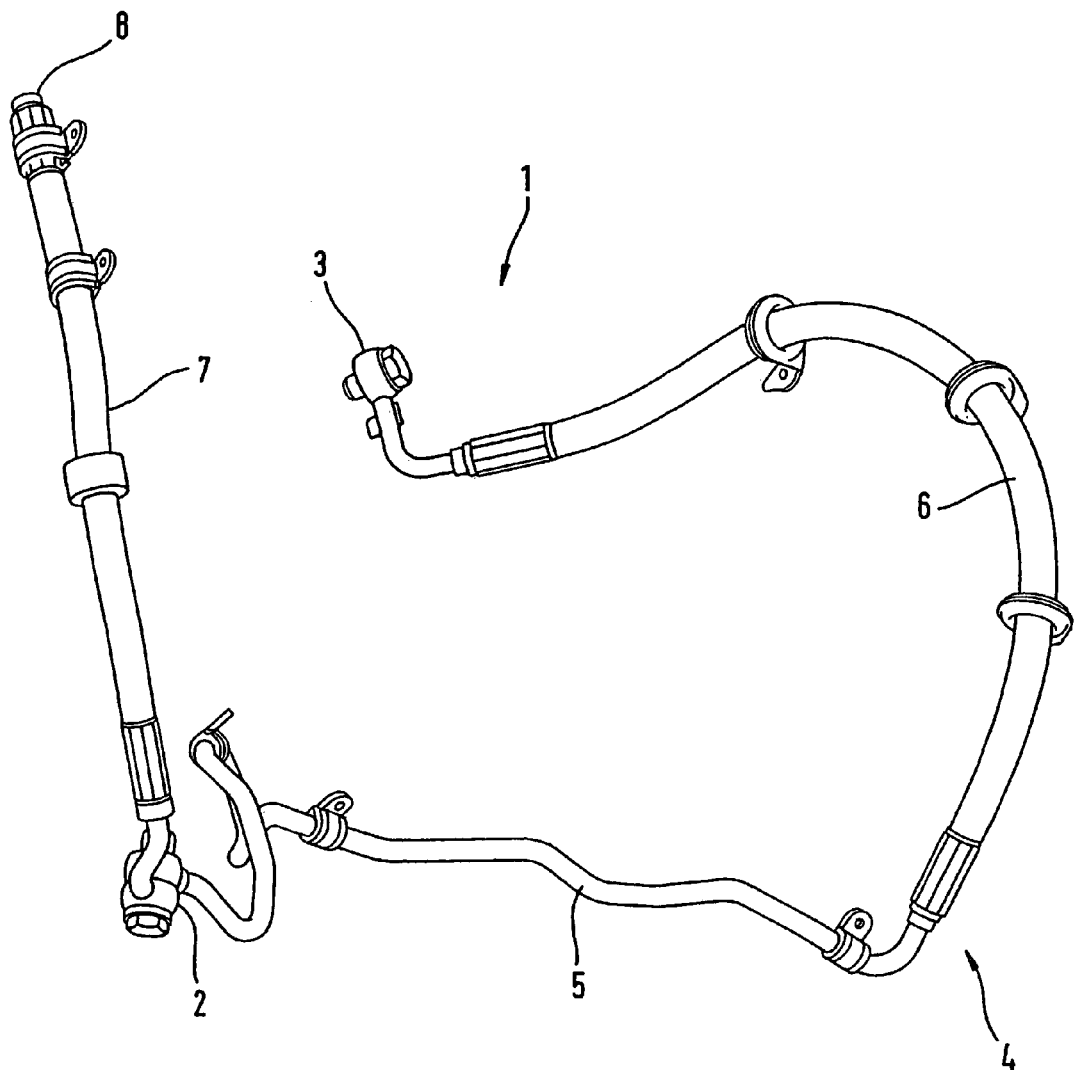
FIG. 1 shows a perspective view of the line arrangement according to the invention with a line section through which there is not a flow.

FIG. 1 illustrates a line arrangement 1 according to the invention for the hydraulic system of an active vehicle. However, the solution according to the invention can also be applied in any other conceivable hydraulic system in which pulsations occur, such as for example in a servo-steering system, as a result of the transmission of pressure and volume flows. In the case of 2, the line arrangement 1 is connected to a pump (not illustrated). In the case of 3, the line arrangement 1 is connected to an actuator (also not illustrated). The connecting line 4, which connects the pump to the actuator, is provided between the ports 2 and 3. The connecting line 4 is composed partly of a metal tube 5 and also of a resilient hose 6 which is formed from a textile-reinforced or metal-reinforced hose which is known from the prior art.

A further line 7 branches off from the port 2. There is not a flow through this line 7. Line 7 is a spur line which is closed off at its end 8 facing away from the branch 2. The spur line is also composed of an elastic, textile-reinforced or metal-reinforced hose. Depending on the application, the branch to the spur line can be situated between the pump and actuator at any other desired location on the connecting line 4 through which there is a flow.

Figure 2:
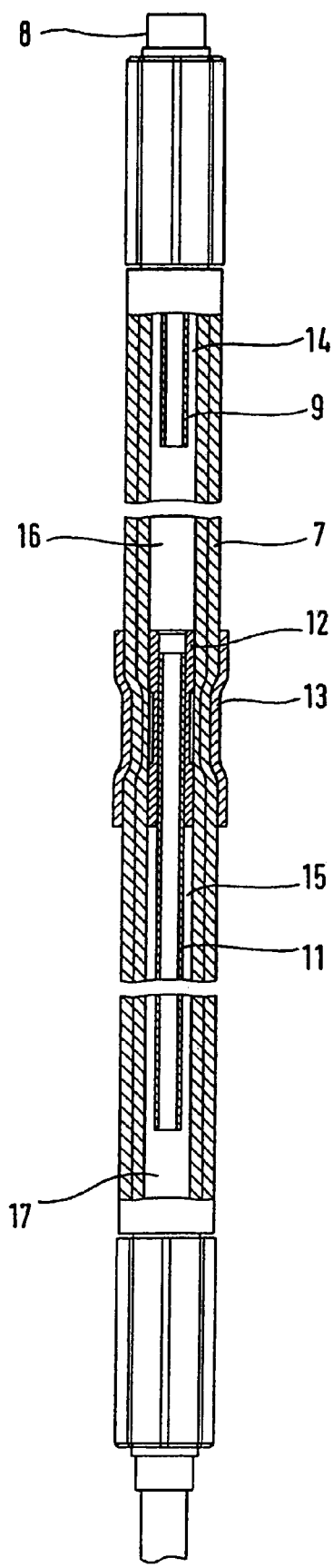
FIG. 2 shows a sectional view of the line section through which there is not a flow according to FIG. 1.

FIG. 2 illustrates the spur line 7 in section. The spur line 8 is closed off at the end 8 pointing upwards in the illustration. At the end pointing downwards, the line leads to the connection 2 to the pump.

Two inner hoses 9 and 11 are arranged in the spur line 7. These two hoses have a smaller diameter than the outer hose of the spur line 7 and are arranged coaxially in it. The hose 9 is connected to the outer hose 7 via the arrangement which closes off the hose end 8. In the case of the inner hose 11 which is arranged in the center of the outer hose 7, the connection is made via a sleeve 12 which is connected to the inner hose 11 and is arranged in the outer hose 7. The outer diameter of the sleeve 12 is matched to the inner diameter of the outer hose 7, at least in parts. So that the sleeve 12 does not slip in the outer hose 7, a sleeve-shaped clamp 13 is provided outside the outer hose 7, at the height of the sleeve 12.

The two inner hoses 9 and 11 extend over only part of the outer spur line 7. They point in the direction of the pump with their free ends. They can also point away from the pump. However, this is not illustrated in the figures. They each form an annular space 14 and 15 with the spur line 7. An empty chamber 16 and 17 is produced in front of each of the free ends of the inner hoses 9 and 11.

The fluid column in the dead end line 7 is interrupted by the inner hoses 9 and 11. This interruption leads to a situation in which pulsation waves in the fluid column are divided, then cover different distances, are partially reflected and combined again. When the combination occurs, the pulsation waves are superimposed on one another in antiphase and thus become damp.

According to a further embodiment (not illustrated), that end of the line 7 which points away from the pump is not closed off but rather connected at a suitable location to the connection line 4 so that the line 7 is embodied as a parallel line to the connecting line 7 and thus has a flow through it.

The solution according to the invention also works without the inner hoses 9, 11, described in conjunction with FIG. 2, as the damping element in the line arrangement 1. However, each entire system can be adjusted and set quite precisely by means of the inner hoses 9 and 11, in particular by means of their number, arrangement in the line 7, orientation in the line and length. Hoses corresponding to the hoses 9 and 11 can also be provided in the resilient hose 6 of the connecting line 4.

The invention claimed is:

1. A pipe arrangement for transmitting volume flows of a fluid, comprising:
    a port which is assigned to a pump,
    a port which is assigned to a consumer,
    a connecting pipe which connects the pump to the consumer,
    an outer pipe having an open end and a closed end, which outer pipe is connected to the fluid at its open end, and which outer pipe is at least partially composed of an elastic hose, and
    an inner hose of a relatively small diameter, which
        (i) is oriented coaxially with respect to the outer pipe,
        (ii) is disposed to extend in the elastic hose of the outer pipe, and
        (iii) has one free end which points in the direction of the open end of the outer pipe and points away from the closed end of the outer pipe, wherein an outer diameter of the inner hose at its free end is smaller than an inner diameter of the outer pipe to form a space between the outer diameter of the inner hose and the inner diameter of the outer pipe.

2. The pipe arrangement according to claim 1, wherein the pipe, through which there is no flow of the fluid, branches off directly from the port, which is assigned to the pump.

3. The pipe arrangement according to claim 2, wherein a plurality of inner hoses of different lengths are arranged in the outer elastic hose of the pipe through which there is no flow of the fluid.

4. The pipe arrangement according to claim 1, wherein the pipe, through which there is no flow of the fluid, branches off from the connecting pipe.

5. The pipe arrangement according to claim 4, wherein a plurality of inner hoses of different lengths are arranged in the outer elastic hose of the pipe through which there is no flow of the fluid.

6. The pipe arrangement according to claim 1, wherein a plurality of inner hoses of different lengths are arranged in the outer elastic hose of the pipe through which there is no flow of the fluid.

7. Pipe element comprising:
one port for a fluid connection to a fluid circuit,
an outer pipe, which has an open end connected to the port and which has a closed end, and
an inner pipe, which is arranged inside and orientated coaxially with respect to the outer pipe and which has at least one free end which points in a direction of the open end of the outer pipe and points away from the closed end of the outer pipe,
wherein at least one of the outer pipe and the inner pipe is at least partially composed of an elastic hose, and
wherein an outer diameter of the inner pipe at its free end is smaller than an inner diameter of the outer pipe to form a space between the outer diameter of the inner pipe and the inner diameter of the outer pipe.

8. Pipe element according to claim 7, wherein the outer pipe and the inner pipe are at least partially composed of an elastic hose.

9. Pipe element according to claim 8, wherein the elastic hose which is at least part of the inner pipe is arranged in the elastic hose which is at least part of the outer hose.

10. Pipe element according to claim 9, wherein a plurality of inner hoses of different lengths are arranged in the outer elastic hose of the outer pipe.

11. A pipe arrangement according to claim 7, wherein a plurality of said inner pipes are arranged in the outer pipe.

12. A pipe arrangement for transmitting volume flows of a fluid comprising:
a port which is assigned to a pump,
a port which is assigned to a consumer,
a connecting pipe which connects the pump to the consumer, and
a pipe element comprising:
one port for a fluid connection to a fluid circuit,
an outer pipe, which has an open end connected to the port and which has a closed end, and
an inner pipe, which is arranged inside and orientated coaxially with respect to the outer pipe and which has at least one free end which points in a direction of the open end of the outer pipe and points away from the closed end of the outer pipe,
wherein at least one of the outer pipe and the inner pipe is at least partially composed of an elastic hose,
wherein the port of the pipe element is in fluid connection with one of the port which is assigned to the pump, the port which is assigned to the consumer and the connection pipe, and
wherein an outer diameter of the inner pipe at its free end is smaller than an inner diameter of the outer pipe to form a space between the outer diameter of the inner pipe and the inner diameter of the outer pipe.

13. A pipe arrangement according to claim 12, wherein the outer pipe and the inner pipe are at least partially composed of an elastic hose.

14. A pipe arrangement according to claim 13, wherein the elastic hose which is at least part of the inner pipe is arranged in the elastic hose which is at least part of the outer hose.

15. A pipe arrangement according to claim 14, wherein a plurality of inner hoses of different lengths are arranged in the outer elastic hose of the outer pipe.

* * * * *